US012749148B2

(12) United States Patent
O'Neil et al.

(10) Patent No.: US 12,749,148 B2
(45) Date of Patent: Sep. 29, 2026

(54) NEURAL UPSAMPLING AND DENOISING RENDERED IMAGES

(71) Applicant: Arm Limited, Cambridge (GB)

(72) Inventors: Liam James O'Neil, Bedale (GB); Ridhwanul Haque, Manchester (GB); Yanxiang Wang, Sale (GB); Joshua James Sowerby, London (GB); Samuel James Edward Martin, Waterbeach (GB)

(73) Assignee: Arm Limited, Cambridge (GB)

( * ) Notice: Subject to any disclaimer, the term of this patent is extended or adjusted under 35 U.S.C. 154(b) by 190 days.

(21) Appl. No.: 18/497,608

(22) Filed: Oct. 30, 2023

(65) Prior Publication Data

US 2025/0139740 A1 May 1, 2025

(51) Int. Cl.

| | |
|---|---|
| ***G06T 3/4053*** | (2024.01) |
| ***G06T 3/18*** | (2024.01) |
| ***G06T 5/20*** | (2006.01) |
| ***G06T 5/50*** | (2006.01) |
| ***G06T 5/70*** | (2024.01) |
| ***G06V 10/60*** | (2022.01) |

(52) U.S. Cl.

CPC .............. *G06T 3/4053* (2013.01); *G06T 3/18* (2024.01); *G06T 5/20* (2013.01); *G06T 5/50* (2013.01); *G06T 5/70* (2024.01); *G06V 10/60* (2022.01); *G06T 2207/20084* (2013.01); *G06T 2207/20221* (2013.01)

(58) Field of Classification Search

None

See application file for complete search history.

(56) References Cited

U.S. PATENT DOCUMENTS

2024/0096050 A1* 3/2024 Ouyang .................... G06T 5/70

FOREIGN PATENT DOCUMENTS

WO WO-2020186765 A1 * 9/2020 ............... G06T 5/70

OTHER PUBLICATIONS

Response to Combined Search and Examination Report under Sections 17 and 18(3), Filed Oct. 17, 2025, 18 pages.

Schied, et al, "Gradient Estimation for Real-Time Adaptive Temporal Filtering," ACM Comput. Graph. Interact. Tech, vol. 1, No. 2, Article 24, Published Aug. 2018, 16 pages.

Cyberpunk, "Phantom Liberty Coming Sep. 26, 2023," Home of Cyberpunk 2077 Universe-games, anime & more, https://www.cyberpunk.net/us/en/, Downloaded Jun. 7, 2023, 13 pages.

(Continued)

*Primary Examiner* — David Ometz

(74) *Attorney, Agent, or Firm* — Berkeley Law & Technology Group, LLP

(57) ABSTRACT

One or more lighting components are projected onto pixel locations of a rendered image with sampling locations set off from pixel location centers according to associated jitter vectors. The sampled image is denoised in way that preserves the associated jitter vectors, and may be performed separately for different lighting components. The denoised image is processed using upsampling and/or temporal antialiasing, using the associated jitter vectors, to an image format having a spatial resolution at least as high as the denoised image.

19 Claims, 9 Drawing Sheets

(56) References Cited

OTHER PUBLICATIONS

Intel, "Open Image Denoise, High-Performace Denoising Library for Ray Tracking," https://www.openimagedenoise.org/, Inital beta release & copyright 2018-2023, 6 pages.
Schied, et al, "Spatiotemporal Variance-Guided Filtering: Real-Time Reconstruction for Path-Traced Global Illumination," HPG '17, Jul. 28-30, 2017, h$p://dx.doi.org/10.1145/3105762.3105770, 12 pages.
Hasselgren, et al, "Neural Temporal Adaptive Sampling and Denoising," DOI: 10.1111/cgf.13919, vol. 39 (2020), No. 2, EUROGRAPHICS 2020, 9 pages.
Thomas, et al, "Temporally Stable Real-Time Joint Neural Denoising and Supersampling," Proc. ACM Comput. Graph. Interact. Tech., vol. 5, No. 3, Article 21. Publication date: Jul. 2022, https://doi.org/10.1145/3543870, 22 pages.
Patents Act 1977: Combined Search and Examination Report under Sections 17 and 18(3), Mailed Feb. 25, 2025, 7 pages.

* cited by examiner

NEURAL UPSAMPLING AND DENOISING RENDERED IMAGES

FIELD

The field relates generally to processing a rendered image, and more specifically to neural denoising and upscaling a rendered image.

BACKGROUND

Rendering images using a computer has evolved from low-resolution, simple line drawings with limited colors made familiar by arcade games decades ago to complex, photo-realistic images that are rendered to provide content such as immersive game play, virtual reality, and high-definition CGI (Computer-Generated Imagery) movies. While some image rendering applications such as rendering a computer-generated movie can be completed over the course of many days, other applications such as video games and virtual reality or augmented reality may entail real-time rendering of relevant image content. Because computational complexity may increase with the degree of realism desired, efficient rendering of real-time content while providing acceptable image quality is an ongoing technical challenge.

Producing realistic computer-generated images typically involves a variety of image rendering techniques, from rendering perspective of the viewer correctly, rendering different surface textures, and providing realistic lighting. But rendering an accurate image takes significant computing resources, and becomes more difficult when the rendering must be completed many tens to hundreds of times per second to produce desired framerates for game play, augmented reality, or other applications. Specialized graphics rending pipelines can help manage the computational workload, providing a balance between image quality and rendered images or frames per second using techniques such as taking advantage of the history of a rendered image to improve texture rendering. Rendered objects that are small or distant may be rendered using fewer triangles than objects that are close, and other compromises between rendering speed and quality can be employed to provide the desired balance between frame rate and image quality.

In some embodiments, an entire image may be rendered at a lower resolution than the eventual display resolution, significantly reducing the computational burden in rendering the image. Even with such techniques, the number of triangles that may be rendered per image while maintaining a reasonable frame rate for applications such as gaming or virtual/augmented reality may be significantly lower than the display resolution of a modern smartphone, tablet computer, or other device. This may result in a rendered image in which contains an upsampled image that has resolution scaling or upsampling artifacts, or includes other imperfections as a result of such constraints on the number of calculations that can be performed to produce each image.

Similarly, it may be desirable to reduce the number of rays that are traced to produce a high quality rendered image, such as tracing only those rays that are visible to the viewer by starting from the viewer's perspective and tracing backward to the light source. Even with such techniques, the number of light rays that can be traced per image while maintaining a reasonable frame rate for applications such as gaming or virtual/augmented reality may be orders of magnitude lower than might be captured by a camera photographing the same image in real life. This may result in a rendered image in which contains pixel noise, has resolution scaling or upsampling artifacts, or includes other imperfections as a result of such constraints on the number of calculations that can be performed to produce each image.

For reasons such as these, it is desirable to manage image artifacts in rendered images, such as during real-time rendered image streams.

BRIEF DESCRIPTION OF THE DRAWINGS

The claims provided in this application are not limited by the examples provided in the specification or drawings, but their organization and/or method of operation, together with features, and/or advantages may be best understood by reference to the examples provided in the following detailed description and in the drawings, in which:

Figure 1:
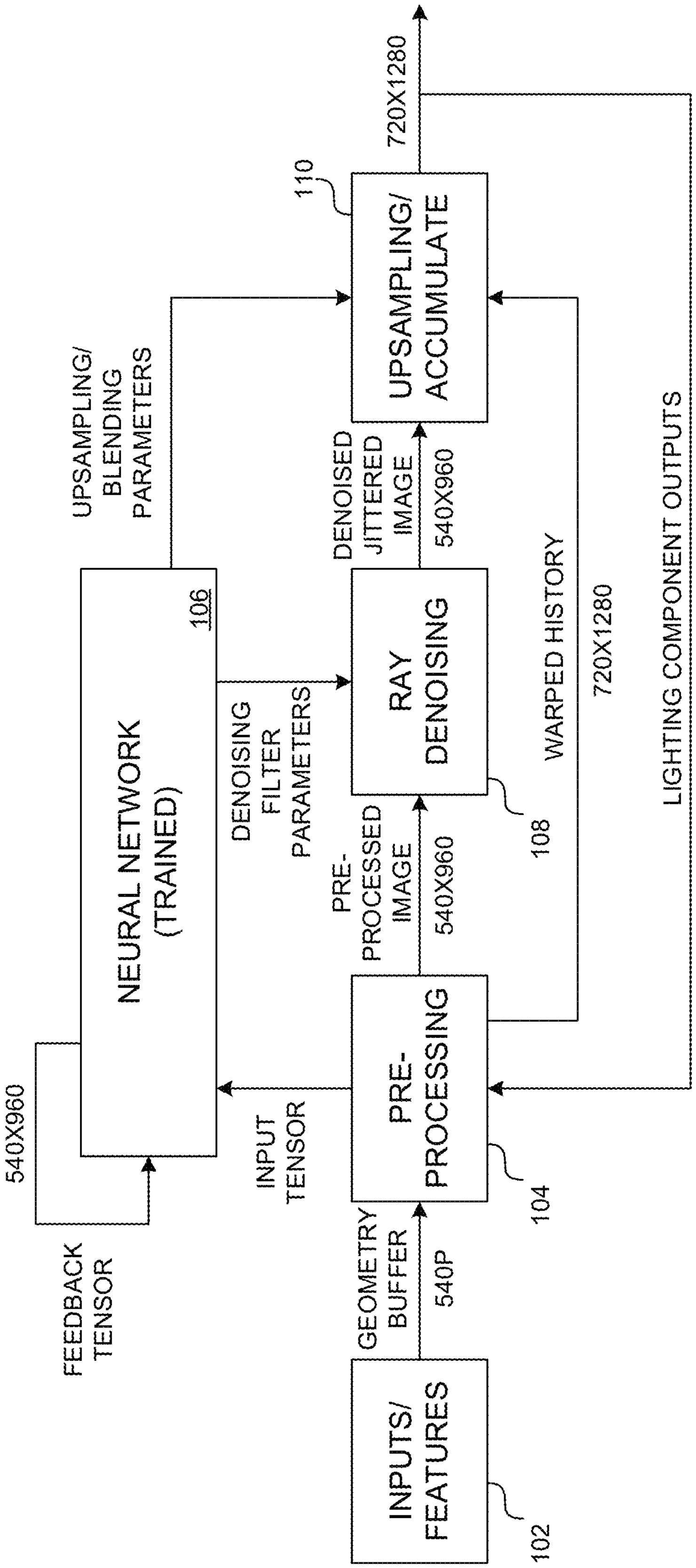
FIG. 1 is a schematic block diagram of a rendered image processing pipeline configured to preserve pixel sampling jitter offsets in denoising a rendered image before upsampling using the jittered pixel samples, consistent with an example embodiment.

Reference is made in the following detailed description to accompanying drawings, which form a part hereof, wherein like numerals may designate like parts throughout that are corresponding and/or analogous. The figures have not necessarily been drawn to scale, such as for simplicity and/or clarity of illustration. For example, dimensions of some aspects may be exaggerated relative to others. Other embodiments may be utilized, and structural and/or other changes may be made without departing from what is claimed. Directions and/or references, for example, such as up, down, top, bottom, and so on, may be used to facilitate discussion of drawings and are not intended to restrict application of claimed subject matter. The following detailed description therefore does not limit the claimed subject matter and/or equivalents.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to aid in understanding these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As graphics processing power available to smart phones, personal computers, and other such devices continues to grow, computer-rendered images continue to become increasingly realistic in appearance. These advances have enabled real-time rendering of complex images in sequential image streams, such as may be seen in games, augmented reality, and other such applications, but typically still involve significant constraints or limitations based on the graphics processing power available. For example, images may be rendered at a lower resolution than the eventual desired display resolution, with the render resolution based on the desired image or frame rate, the processing power available, the level of image quality acceptable for the application, and other such factors. Similarly, ray-traced images can be denoised, reducing the impact of the limited number of rays that can be traced in generating real-time rendering of image streams.

Rendering images at a lower resolution than the display resolution can significantly reduce the computational burden of rendering sequential images in real time, enabling even relatively low power devices such as smartphones to display complex rendered graphics at frame rates that provide for engaging game play or that are suitable for other graphics applications such as augmented reality. For example, an image rendered at 1000×500 pixels that is subsequently scaled and displayed on a 2000×1000 pixel display may be scaled using a scale factor of 2×2, resulting in approximately a quarter the computational workload for the rendering unit relative to rendering a full-scale image.

The number of light rays that are traced in a large or complex image to produce a realistic image with acceptably low levels of illumination noise is very high, and similarly presents a computational challenge for real-time rendering of image sequences. High-quality sequential images such as rendered movies often take days or weeks to render rather than the hour or two runtime length of the rendered movie, which is impractical to achieve on mobile devices, for game play, for augmented or virtual reality, or for other applications where real-time rendering of images with acceptable image quality is important.

Ray tracing computation can be reduced for an image frame by significantly limiting the number of traced light rays, again resulting a significant reduction in computations per rendered image frame. But tracing fewer light rays per pixel results in less accurate and more noisy illumination, including especially more lighting noise in areas that receive relatively few light rays. Monte Carlo (randomized) selection or sampling of light rays to trace can improve approximation of real-life light tracing, but hundreds or thousands of ray-traced samples per pixel may still be desired to produce photo-realistic images with acceptably low noise using traditional techniques.

Problems such as these may be addressed in the same graphics pipeline such as by performing rendering at a low resolution and upsampling the rendered image to a desired display resolution, and/or by employing denoising techniques such as trilinear filtering or other filtering methods to a rendered image. But, simply combining various methods such as these sequentially into a graphics rendering pipeline can result in reducing the effectiveness of the methods employed, such as where an upsampling method employing jitter to reduce image artifacts such as checkerboarding or aliasing is weakened by a denoising solution that employs a history buffer that effectively reduces or eliminates the impact of jitter on the upsampled pixels.

Some examples presented herein therefore provide for improved upsampling a rendered image using jitter values and denoising the rendered image using a denoising method that does not interfere with jittered sampling of the rendered image, allowing both the denoising and upsampling steps to work as intended. In a more detailed example, one or more projected lighting components in a rendered image are offset from pixel location centers in the rendered image according to associated jitter vectors, and the lighting components are denoised in a way that preserves the associated jitter vectors. The denoised image is then transformed to an upsampled image in a second image format using the associated jitter vectors, such that the upsampled image has a spatial resolution higher than the rendered image.

Performing denoising before upscaling may provide benefits such as reducing a number of pixels that are processed in performing denoising, and allowing an upsampling algorithm to perform rectification or invalidation of warped history using the best available image (such as where pixels become disoccluded in the current image frame). Implementing a denoising solution before upsampling presents a potential problem in that denoising using a history buffer may have the effect of averaging jittered samples taken from each pixel location over time, reducing the effectiveness of using jittered samples to accurately accumulate pixel values into the upsampled high resolution output over time, in turn reducing checkerboarding and other such image artifacts in the output image. Using a denoising process that preserves the jittered or offset pixel location samples through the denoising process is therefore desirable in that it enables the upsampling algorithm to use the jittered pixel samples to reduce image artifacts such as checkerboarding and aliasing.

FIG. 1 is a block diagram of a rendered image processing pipeline configured to preserve pixel sampling jitter offsets in denoising a rendered image before upsampling using the jittered pixel samples, consistent with an example embodiment. The rendered image and various features such as motion vectors, geometry, and other features may be provided such as from a rendering unit at 102. The rendered image in this example may be a 540P progressive image, having a resolution of 540×960 pixels with red, green, and blue image intensity or color value channels. Then rendered image may be preprocessed at 104, which in various examples may include adjusting for brightness, contrast, gamma, and other such functions. In further examples, advanced processing such as tone mapping, warping a history image to match the pixel locations of the rendered image (such as by using motion vectors provided by the renderer or derived from the rendered image), providing one or more input tensors to a trained neural network 106, and other such processes may be performed. In the example of FIG. 1, an input tensor may be provided to trained neural network 106, a preprocessed image having 540×960 pixels resolution may be provided to ray denoising block 108, and a warped history image having 720×1080 pixels resolution may be provided to upsampling/accumulate block 110.

Trained neural network 100 in this example may use image data provided as an input tensor to generate a feedback tensor comprising an image at 540×960 pixels resolution. An output tensor of trained neural network 106 may comprise denoising filter parameters provided to ray denoising block 108, and upsampling/blending parameters such as an alpha blending coefficient to upsampling/accumulate block 110. Although trained neural network 106 in this example comprises a single neural network configured to generate multiple output tensors for different stages of the image processing pipeline such as denoising and upsampling/accumulation, other examples may employ separate or discrete neural networks to perform functions such as these and/or other functions. Ray denoising block 108 may receive the preprocessed image and denoising filter parameters, and may perform denoising using a filter such as a trilinear filter or other suitable filter to reduce the amount of noise in the preprocessed rendered image. A ray denoising filter employed in block 108 in this example may reduce pixel noise in the image to be upsampled before sending the denoised jittered image to upsample/accumulate block 110 in a way that preserves jitter offset pixel sampling locations. This may be achieved, for example, using a denoising technique that does not rely on use of a history buffer in a denoising process that may cause a pixel sample location to average out to a pixel center (e.g., no longer jitter offset) location over time.

A denoised image with jitter offset pixel sampling locations still intact may be provided to upsample/accumulate block 110 for upsampling. In the example of FIG. 1, a denoised jittered image is a 540×960 pixel resolution image, and is upsampled to 720×1080 resolution at 110. In a further example, the upsampled image may be combined with a warped image history provided from preprocessing block 104, such as using an alpha blending coefficient provided by trained neural network 106 that determines the amount of warped image history to blend with the upsampled image to generate an output image. The upsampled resolution in some examples may be the same as the resolution of the denoised jittered image received from ray denoising block 108, such as where the upsampling/accumulate block is used for temporal antialiasing that makes use of jitter information embedded in the received image.

In a further example, one or more of these processes such as preprocessing at 104, ray denoising at 108, and/or upsampling and accumulating or blending at 110 may be performed separately for different lighting components or types, such as specular lighting, diffuse lighting, and albedo (or the degree to which light impacting a surface is diffusely reflected). In a more detailed example, separate history buffers may be maintained and employed for blending at 110 for each of specular lighting, diffuse lighting, and albedo. An upsampled and blended output image provided from 110 in this example is a 720×1080 image, and may include lighting component outputs that are provided as an accumulated history to pre-processing block 104 as shown in FIG. 1.

Figure 2:
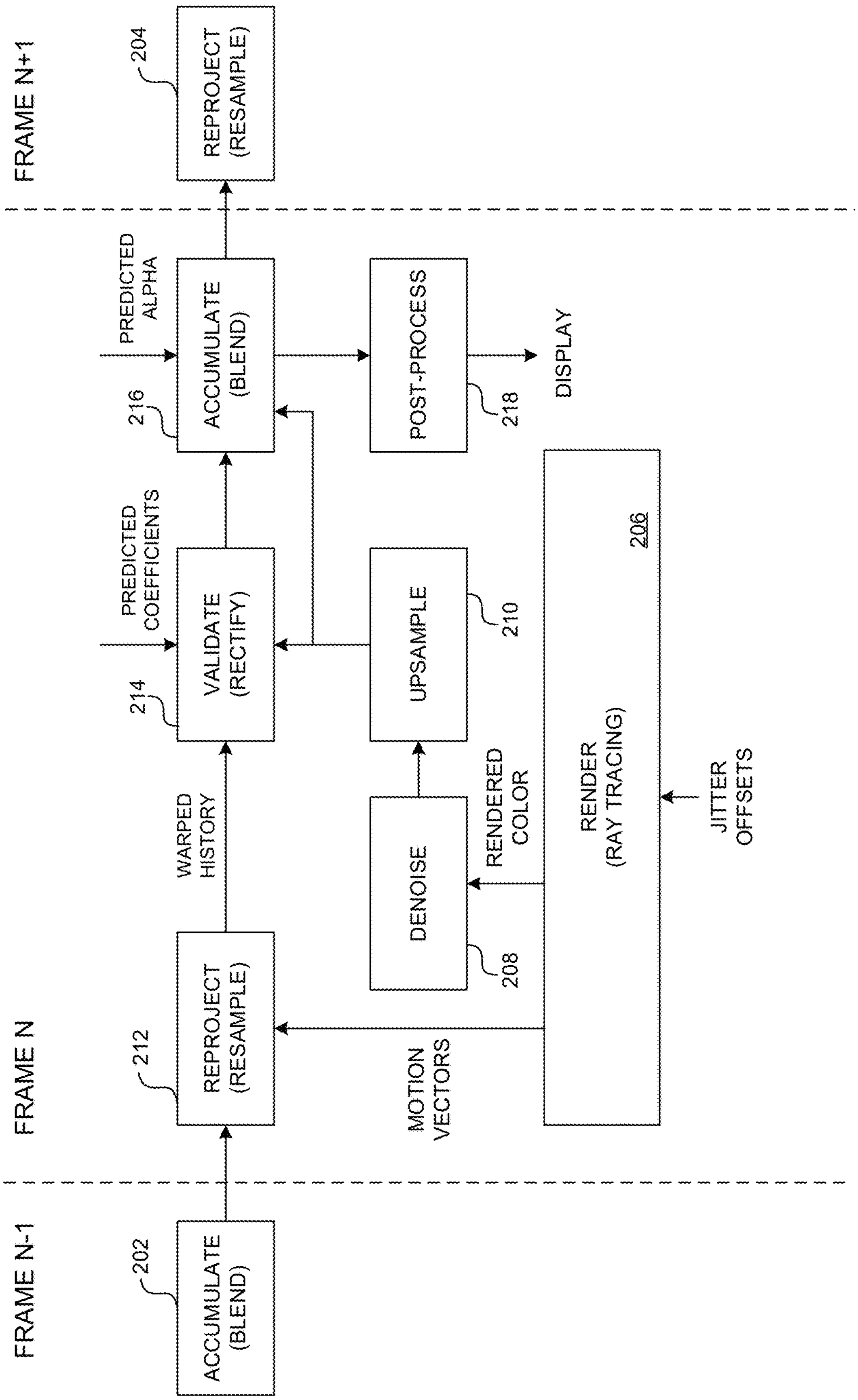
FIG. 2 is a schematic block diagram of an alternate image processing pipeline employing a denoise filter configured to preserve pixel sampling jitter offsets for upsampling using the jittered pixel samples, consistent with an example embodiment.

FIG. 2 is a schematic block diagram of an alternate image processing pipeline employing a denoise filter configured to preserve pixel sampling jitter offsets for upsampling using the jittered pixel samples, consistent with an example embodiment. FIG. 2 shows generally on the left side production of image frame FRAME N−1 for a previous rendering instance, including an image frame 202 comprising an accumulated (blended) history. A center portion of FIG. 2 shows components to produce an image frame FRAME N for a current rendering instance. A portion on the right of FIG. 2 shows an output from the current rendering instance as re-project history block 204 to be processed in a subsequent (e.g., future) rendering instance to produce an image frame FRAME N+1.

Render block 206 may employ rendering and ray tracing to produce a current image frame FRAME N, using jitter offsets and/or other such inputs. The rendered image frame may be rendered at a lower resolution than a desired display resolution, and may be provided as an array of pixel values sampled at jitter offsets from the center of respective pixel locations in the image frame to reduce checkerboarding, aliasing, and other such artifacts. In a further example, an image frame may comprise different color channels such as red, green, and blue color brightness levels for individual pixel locations, and may include separate images or channels for different lighting components such as specular, diffuse, and albedo. A rendered image may be provided to denoise block 208, which may be any type of image denoising filter. In a more detailed example, a trilinear filter is employed to reduce pixel noise and various resolution sampling artifacts in the rendered image. Some example denoising filters 208 may avoid biasing the received rendered image during the denoising process using historical image signal values such as from FRAME N−1 or previous image frames. Disadvantageously, incorporation of such historical image signal values may have the effect of averaging or integrating the pixel sample locations over prior image frames such that the sampling jitter offsets are essentially filtered out and resolve to the center of each pixel location. A denoising filter at block 208 in this example therefore may be employed in such a way that it retains jitter offsets of pixel sampling locations provided by render block 206, passing along a denoised but still jittered image to upsample block 210.

Upsample block 210 may be operable to map pixel values in a lower resolution rendered image offset by jitter vectors to a higher resolution using the jitter vectors. In more detailed examples, the mapped signal intensity values may be scaled based on a length of the jitter vectors such that shorter jitter vectors closer to pixel centers are weighted more heavily than pixel values associated with long jitter vectors. Upsample block 210 may generate a sparse image having null pixel locations, which may be filled by interpolating between and/or among mapped image signal intensity values in nearby upscaled image pixel locations and/or image signal intensity values of a warped history image frame. The upsampled image may be provided to validate (rectify) block 214 and to accumulate (blend) block 216, and in some examples may comprise different outputs to blocks 214 and 216. In another example, upsample block 210 may upsample the denoised image from denoise block 208 to the same resolution, such as to perform temporal antialiasing in conjunction with accumulate (blend) block 216. More detailed embodiments of upsampling are described herein.

A rendered image may also be provided by render block 206 along with motion vectors (e.g., for objects or textures in image frame FRAME N relative to rendering instance N−1) to the reproject (resample) block 212, which may receive an accumulated image history output at 202 referenced to a previous rendering instance. Reproject history block 212 may re-project or warp an accumulated image history output onto a current rendered image, such as by using rendered or estimated motion vectors from render block 206 or another source. This may serve to align pixel values of an output image frame from a previous rendering instance with pixel values of the upsampled image frame in a current rendering instance.

Validate (rectify) block 214 may use a warped or pixel-aligned version of a past image frame to mitigate effects of image content being disoccluded or becoming visible in the current image frame FRAME N that were not visible in the prior image frame FRAME N−1, such as by reducing or clamping an influence of accumulated historic image frames on disoccluded pixels in the current image frame. In a further example, rectification or history invalidation may also be performed for changes in view-dependent lighting, such as where the camera's current view direction has changed sufficiently from a prior image's point of view to render specular highlight and/or reflection detail invalid between image frames.

Rectify history block 214 may also receive predicted blending coefficients such as from a trained neural network (not shown) to predict or estimate a degree to which a warped history is to be combined with the current rendered frame. A resulting rectified history output from block 214 may therefore comprise a combination of accumulated image history as well as some "clamped" pixels from a current rendered image, such as at locations where pixels become disoccluded in image frame FRAME N.

Accumulate history block 216 in some examples may selectively combine or blend a re-projected, rectified history received from rectify history block 214 with a current upscaled image frame. An accumulation process at accumulate history block 216 may use a predicted parameter "alpha" received from a trained neural network to determine a proportion of the current denoised and upsampled image frame to be blended with the re-projected, rectified history. Output from accumulate history block 216 may be provided to post-processing block 218, which may perform various filtering and/or processing functions to form an output image for display. An accumulated or blended image output from accumulate block 216 may also be stored or provided for processing the next image frame, as reflected by re-project block 214 (corresponding to the current frame's re-project block 212, which similarly receives prior frame accumulated image history from accumulate block 202). An example architecture of FIG. 2 may be used to provide significant advantages over current state-of-the-art approaches to denoising and upscaling a rendered image before displaying the image, providing reduced image artifacts such as checkerboarding and aliasing in the displayed image due to preservation of the pixel sampling jitter offsets during denoising such that they can be employed in the upsampling process.

Figure 3:
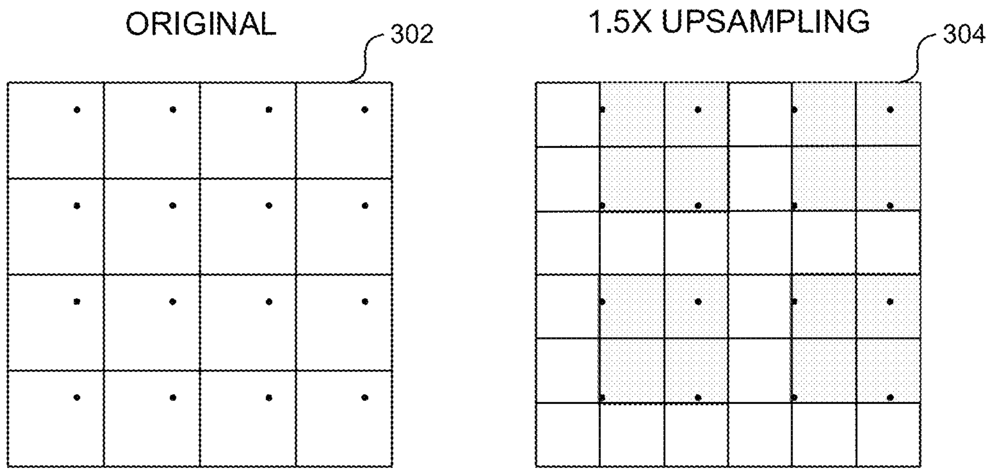
FIG. 3 is a diagram showing upsampling a rendered image to higher resolution using jitter, consistent with an example embodiment.

FIG. 3 is a diagram showing upsampling a rendered image to higher resolution using jitter, consistent with an example embodiment. Operations shown in FIG. 3 may be executed by block 210 (FIG. 2), for example. At 302, a portion of an original rendered image is shown, such as a portion of an image rendered at render block 206. A sampling point deviating from the center of each pixel location by a jitter vector amount is also shown, which in the example image frame shown at 302 is upward and to the right of the center of each pixel of the rendered image. If this image was not upscaled but was directly recorded in a history buffer such as the accumulate buffers of the example shown in FIG. 2, one sample would be accumulated per history buffer pixel. But, when the original rendered image shown at 302 is upsampled, the resulting sampling patterns result in less than one sample per history buffer pixel or per upsampled image, and so may show artifacts such as checkerboarding, aliasing, and the like depending in part on factors such as the upsampling ratio.

An upsampled image with 1.5× the resolution of the original image shown at 302 is shown at 304, with the jitter-derived sampling points shown in the original image at 302 mapped to the corresponding locations in the upsampled image. The pixels in the upsampled image that include a sampling point may tend to cluster when non-integer upsampling ratios such as 1.5× upsampling are used, forming a checkerboard in the example shown at 304 as denoted by the shaded boxes which contain the mapped sampling points. The empty pixel locations shown at 304 do not contain a sampling point from the original image 302, and in some examples may be filled by interpolation, image history, or by a combination of interpolation and history or other such means. In some examples, integer upsampling ratios may result in a more uniform distribution of pixels with sampling points within the upsampled image, alleviating much of the checkerboarding, aliasing, and other such issues visible in the 1.5× upsampling example shown at 204.

The 1.5× upsampled image shown at 304 illustrates another problem with traditional upscaling algorithms in that sample points very near the edge of upsampled pixels in 304 dictate the color or shading of the entire pixel in which the sampling point resides, but have no influence on neighboring pixels, some of which may be a tiny fraction of a pixel width away from the sampling point and some of which may not have a sampling point located within (i.e., may be empty). Further, because the upsampled pixels shown at 304 span multiple original pixels shown at 302, the upsampled pixels cannot be accurately mapped back to the original image without further information such as separately retaining the sampling points used or other such original image information.

Figure 4:
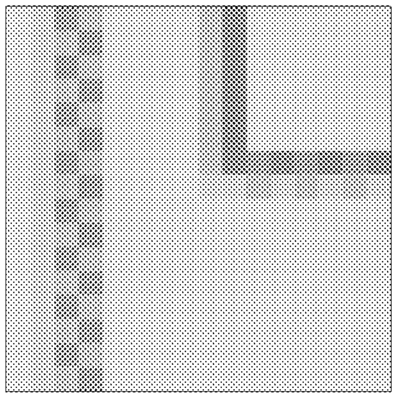
FIG. 4 is a rendered image upscaled at 1.5×, consistent with an example embodiment.

FIG. 4 is a rendered image upscaled at 1.5×, consistent with an example embodiment. The image shown in FIG. 4 further demonstrates how upsampling at a non-integer ratio can result in an upsampled image having checkerboarding, stair-stepping, aliasing, and other artifacts generated as a function of the upsampling ratio. Fine details such as lines show up as alternating dark and light pixels in the image of FIG. 4, while somewhat larger lines show up as a checkerboard of alternating dark and light pixels. Patterns near the sampling frequency may similarly have visible aliasing patterns, moiré patterns, and other visible sampling patterns or effects not in the original rendered image.

Figure 5:
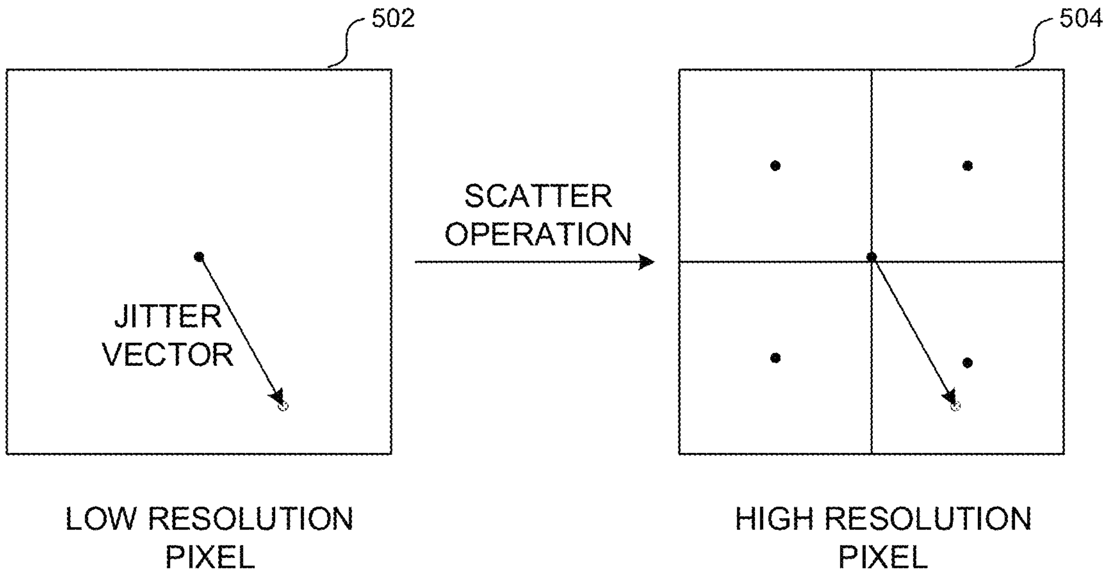
FIG. 5 shows a more detailed upsampling process, consistent with an example embodiment.

FIG. 5 shows a more detailed upsampling process, consistent with an example embodiment. Operations shown in FIG. 5 may be executed by block 210 (FIG. 2) in a particular implementation. At 502, a low resolution pixel from a rendered image is shown, including a dark dot marking the center of the pixel. Such a rendered image may be provided as output pixel values from render block 206, for example. A jitter vector denoted by a line with an arrow represents an offset from the center of the pixel at which the rendered image's color or intensity is to be sampled, which in a further example may be applied to each pixel in the low resolution rendered image frame. A sampling point in the example of 502, as altered by the jitter vector, may be represented by a gray dot. In a further example, jitter vectors vary from image frame to image frame, ensuring some effective movement of the camera between image frames even when there are stationary objects in the image frame. Repeated variation of the jitter vectors between image frames along with blending the current image frame with a history buffer helps reduce aliasing, checkerboarding, stair stepping, and other sampling artifacts that may otherwise be more visible in the rendered image.

A scatter operation may place a sampling point from a low resolution pixel shown at 502 into a high resolution pixel shown at 504. The high resolution pixel may have a sampling point in only one of four high resolution pixels shown, and may comprise a part of a sparse image. The high resolution pixel and corresponding high resolution image may be used to update a history buffer, and in further examples may have an effect on the history buffer that varies with factors such as recent disocclusion of the pixel. As the upscaling factor increases, the scatter operation shown may have increasingly visible image artifacts, due to factors such as the jittered and scattered sampling points occupying an increasingly small percentage of high resolution pixels.

In a more detailed example, the low resolution coordinate position of the sampling point as shown at 502 can be translated to the sampling point's corresponding pixel in the high resolution pixel shown at 504 using expression [1] as follows:

$$hrCoord(x, y) = \text{floor}\left((lrCoord(x, y) + 0.5 + \text{jitter}) * \text{scale}\right) \quad [1]$$

where:

- hrCoord(x,y) is the (x,y) coordinate position of the pixel sampling point in the high resolution image;
- floor is a function returning the greatest integer less than the input, here yielding the integer coordinates or pixel location of the sampling point in the high resolution image;
- IrCoord(x,y) is the (x,y) coordinate position of the top left corner of the pixel (integer position) in the low resolution image;
- jitter is the offset from the center of a low resolution pixel to the low resolution pixel's sampling point; and
- scale is the scale factor between the low resolution and high resolution pixels and images.

Once the pixel location of the sampling point in the high resolution image is obtained such as by using the above equation, the sample may be written sparsely into the high resolution image using expression [2] as follows:

$$\text{output}(hrCoord(x, y)) = \text{input}(lrCoord(x, y)) \quad [2]$$

where:

- hrCoord(x,y) is the (x,y) coordinate position of the pixel sampling point in the high resolution image;
- IrCoord(x,y) is the (x,y) coordinate position of the top left corner of the pixel (integer position) in the low resolution image;
- input is the input sample read from the sampling point in the low resolution image; and
- output is the output sample written into the pixel location in the high resolution image.

The resulting high resolution image, having each low resolution pixel's sampling point intensity or color value written into a corresponding pixel location in the high resolution image results in a sparse high resolution pixel in which no collisions (or low resolution pixel sampling locations written into the same high resolution pixel location) if the same jitter vector is used to sample all pixels in the low resolution image because there are always fewer low resolution sampling points (or pixels) than there are pixel locations in the high resolution image.

The sparse high resolution image constructed by upsampling according to expressions [1] and [2] and as shown in FIG. 5 can then be written into a history buffer, and an alpha parameter may control the degree to which the pixels in the upsampled image contribute to the corresponding pixel locations within the rectified warped history buffer. A larger alpha and a larger contribution having a greater effect on the history buffer may be desirable when the pixel location has recently become disoccluded and there is little relevant pixel history, while a smaller alpha and corresponding smaller contribution of the pixel value on the history buffer may be desirable when the pixel location has a robust history and is approaching or converging upon a stable value. The alpha value may therefore be considered a complex function of the convergence level and the recency of a reset event such as a disocclusion, and in a further example may be predicted by a trained neural network. A process of combining a current high resolution image frame with a warped history buffer, such a process of combining a current high resolution image frame with a warped history buffer at block 216 (FIG. 2) may be performed using expression [3] as follows:

$$\text{out}(x, y) = lerp(warpedHistory(x, y), sparseSamples(x, y), \text{alpha}(x, y) * \text{mask}(x, y)) \quad [3]$$

where:

- out(x,y) is an output pixel value at a pixel location (x, y) in a new warped history image;
- lerp(a,b,c) is a linear interpolation function that interpolates to a position between the first two arguments a and b specified by a third argument c, with the variable e in this example being between or equal to zero and one;
- warpedHistory(x, y) is a pixel value at a pixel location (x, y) in the accumulated image stored in the warped history buffer;
- sparseSamples(x, y) is a pixel value at a pixel location (x, y) the upscaled sparse high resolution image comprising pixel values derived from a low resolution rendered image;
- alpha(x, y) is an alpha or blending value that specifies the degree to which a pixel value a pixel location (x, y) in the upsampled sparseSamples(x, y) image contributes to a pixel value at a corresponding pixel location within the warped history buffer; and
- mask(x, y) is a mask having a value of one at a pixel location (x, y) where the upsampled sparseSamples(x, y) image contains a valid pixel value mapped from the low resolution rendered image and zero where the upsampled image does not contain a pixel value mapped from the low resolution rendered image.

Because these methods may result in image artifacts such as checkerboarding, aliasing, stair stepping, and the like due at least in part to the nature of upsampling at arbitrary non-integer values, the pixel values in the upscaled high resolution image in some examples may be further weighted based on factors such as jitter vector length or the distance of the pixel sampling point from the center of the pixel. In one such example, the pixel shown at 502 shows a black dot at the center of the pixel, which is the point from which a jitter vector is derived. A sampling point represented by a gray dot is relatively far from the center of the pixel, and the distance and direction from the center of the pixel to the sampling point is represented by a jitter vector shown as a line and an arrow, such that the jitter vector comprises both direction and distance values describing the path from the black dot at the center of pixel 502 to the sampling point represented by a gray dot.

The jitter vector's length therefore varies with the distance from the center of the pixel to the sampling point, and is inversely proportional to the degree to which the sampling point is likely to represent the image color or intensity value of a sampling point taken at the center of the pixel. Because sampling points with jitter vector lengths that are relatively long (e.g., approaching 7× the pixel height and width) are much less likely to represent the average value sampling points within the pixel than samples taken near the center of the pixel, jitter vector lengths may be used to scale the contribution of sampling points to an accumulated history buffer such as the accumulate (blend) accumulated history buffer shown at 202 and 216 of FIG. 2.

In a more detailed example, a jitter scale value may be calculated using expression [4] as follows:

$$jitterScale = lerp\left(1.0, \mathrm{Min}Scale, \frac{\mathrm{length(jitter)}}{\mathrm{length(max}Jitter)}\right) \quad [4]$$

where:

- jitterScale is an amount by which a sampling point is to be scaled dependent on a jitter vector length;
- lerp(a, b, c) is a linear interpolation function that interpolates to a position between the first two arguments a and b specified by a third argument c, with the variable c in this example being between or equal to zero and one;
- MinScale is a minimum scale value for the jitterScale value;
- length(jitter) is the length of the jitter vector; and
- length(maxJitter) is the maximum possible length of a jitter vector.

Expression [4] therefore uses linear interpolation to pick a jitterScale scaling value between 1 and MinScale to be applied to the sampling point before adding it to the accumulated history. The scaling value is derived by linear interpolation between 1 and MinScale, based on the jitter vector length's length relative to the maximum possible jitter length. Although the jitterScale scaling value in this example varies linearly with the jitter vector length from the center of the pixel to the sampling point, other examples may use non-linear functions such as gaussian functions, exponential functions, or the like to derive the scaling value from jitter vector length.

In a further example, upsampling artifacts such as checkerboarding, aliasing, and the like may be mitigated by filling empty pixels in the upscaled image with interpolated pixel values. By blending in samples interpolated from the sparse samples in the upscaled image, the sparse samples mapped to the upscaled image may help smooth upsampling artifacts in neighboring upsampled pixel locations. In the high resolution upsampled pixels shown at 504, a sparse sample is mapped into an upscaled image, such that the sparse sample occupies only the lower right upsampled image pixel. The other three pixel locations are unoccupied and do not contain sampling points, and so the upsampled image is deemed to be sparse (i.e., not filled with pixel sample values). This sparse sample high resolution pixels containing sampling points (e.g. masked) may be multiplied by an alpha or blending value predicted by a neural network for blending into the accumulated history, and scaled by the jitter vector length such that sampling points nearer the center of the pixel are more heavily weighted. Because empty pixels in the sparse sample shown at 504 are excluded from the process and remain empty.

Interpolated pixel values for empty pixel values may be added such as based on a predicted beta blending value, further reducing the effect of upsampling artifacts on an accumulated history buffer and output or displayed image. In a more detailed example, interpolated samples are calculated for at least the empty pixel locations that do not contain a sampling point, such as where an inverse mask may be employed to ensure that interpolated samples are only included for locations that do not have a sampling point. An interpolated pixel array masked to include only pixel locations with empty pixel values may be multiplied by a beta coefficient (β) such as may be predicted by a trained neural network to determine a degree to which the interpolated samples should be added to the accumulated history buffer. Interpolated samples may be derived in various examples using traditional interpolation algorithms such as bilinear or cubic interpolation algorithms, or may be derived using a trained neural network, a kernel prediction network, or other such interpolation algorithm.

In a further example, blending a portion of the interpolated pixel color values into empty pixels of sparse upscaled images may be calculated using expressions [5] and [6] as follows:

$$accumAlpha(x, y) = lerp(warpedHistory(x, y), sparseSamples(x, y), \mathrm{alpha}(x, y) * \mathrm{mask}(x, y) * jitterScale) \quad [5]$$

where:

- accumAlpha(x, y) is a pixel value at a pixel location (x, y) in a sparse upscaled image blended with an accumulated history by interpolating between an accumulated history warpedHistory and sparse samples sparseSamples by a degree alpha, weighted using the length of the jitter vector jitterScale, and masked using mask (x, y) to include only pixel locations with sampling points;
- lerp(a, b, c) is a linear interpolation function that interpolates to a position between the first two arguments a and b specified by a third argument c, with the variable c in this example being between or equal to zero and one;
- warpedHistory(x, y) is a pixel value at a pixel location (x, y) in a warped accumulated history buffer of past frames of the upscaled image;
- sparseSamples(x, y) are sparse sample points mapped into an upscaled image from a lower resolution rendered image;
- alpha(x, y) is a blending factor specifying the degree to which sparseSamples(x, y) are to be blended into the warped history to generate the output value accumAlpha(x, y);
- mask(x, y) is a mask having a value of one for pixel locations containing sampling points and a zero for empty pixel locations; and
- jitterScale is an amount by which the sampling point should be scaled, and is primarily derived from the jitter vector length.

Expression [5] uses the alpha(x, y) parameter to determine a degree of blending the sparse samples sparseSamples(x, y)

into an accumulated history warpedHistory(x, y) to generate an output accumAlpha(x, y). A mask mask(x, y) limits the output to pixel locations having a sampling point, and each sample having a sampling point is further scaled by both alpha(x, y) and a jitterScale derived from jitter vector length or distance from the sampling point to the center of the sparse pixel for each pixel with a sampling point in the upscaled image. Expression [6] shown below uses the accumAlpha(x, y) calculated using expression [5] plus interpolated pixel data and an inverse mask to generate an output including interpolated pixel values where empty pixel values exist in accumAlpha(x, y) as follows:

$$\text{out}(x, y) = lerp(accumAlpha(x, y), Interp(jitteredColor(x, y)), \text{beta}(x, y) * (1.0 - \text{mask}(x, y))) \quad [6]$$

where:

- out(x, y) is an output value for a pixel location (x,y) including both interpolated samples scaled using a predicted beta value and an inverse mask and sparse samples scaled in expression [5];
- lerp(a, b, c) is a linear interpolation function that interpolates to a position between the first two arguments a and b specified by a third argument c, with the variable c in this example being between or equal to zero and one;
- accumAlpha(x, y) is a sparse upscaled image blended with an accumulated history calculated in expression [5];
- Interp(jitteredColor(x, y)) is an interpolated pixel value for pixel locations in the sparse upsampled image that do not have sampling points located within the pixel locations;
- beta(x, y) is the amount by which the interpolated pixel values should be blended into the accumulated history buffer; and
- mask(x, y) a mask having a value of one for pixel locations containing sampling points and a zero for empty pixel locations.

Expression [6] uses a linear interpolation function lerp and an inverse mask calculated using mask(x, y) to selectively output accumAlpha(x, y) for pixel locations having sampling points within the pixel locations and interpolated pixel values Interp(jitteredColor(x, y)) scaled by a blending factor, beta(x, y) for pixel locations that are empty or that do not contain sampling points. The output out(x, y) of expression [6] comprises an output that can be added to an accumulated history buffer such as the accumulate (blend) blocks 102 and 116 of FIG. 1, and which may further be used for generating a displayed image as shown at 118 of FIG. 1. The interpolation function Interp may again be a traditional interpolation algorithm such as a bilinear or cubic interpolation algorithm, or may be derived using a trained neural network, a kernel prediction network, or other such interpolation algorithm in various examples.

The processes shown in FIG. 5 show how techniques such as using jitter vector length to scale the ratio of a rendered and upsampled image combined with a warped history buffer to generate a new history and/or a displayed output image can help improve the appearance of upsampling artifacts such as checkerboarding, aliasing, and the like. In another example, empty pixel locations in a sparse upsampled image are filled using interpolation to reduce similar upsampling artifacts. The reduction in visible upsampling artifacts may be particularly noticeable in examples with arbitrary non-integer upsampling ratios, and in upsampling ratios that are particularly large. Because upsampling processes such as these use jitter sampling point information to perform functions such as scaling the weight of a sample based on jitter vector length and using interpolation based on sparse jittered samples to reduce image artifacts, retaining jitter information for the upsampling process may be desired.

Figure 6:
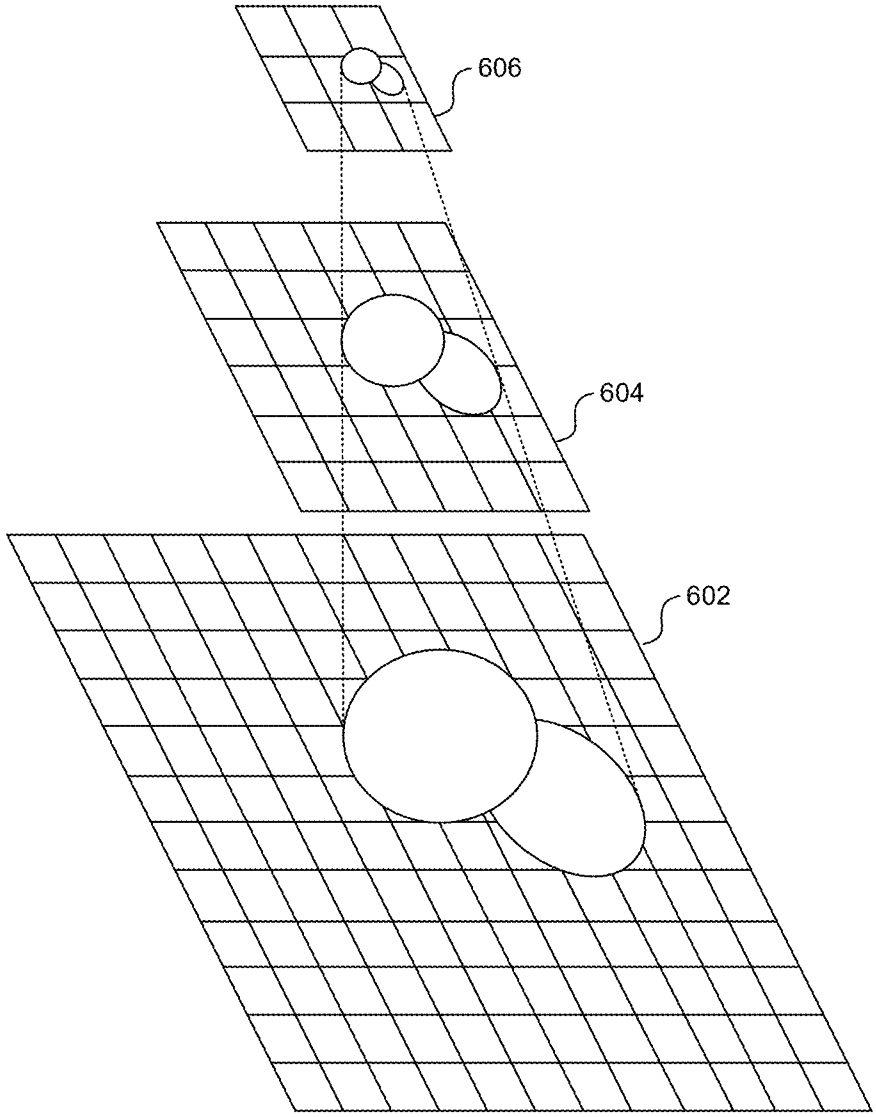
FIG. 6 shows an example denoising process using a trilinear filter, consistent with an example embodiment.

FIG. 6 shows an example denoising process using a trilinear filter, such as a denoising process applied at block 108 (FIG. 1) or block 208 (FIG. 2), consistent with an example embodiment. The trilinear filter in this example is configured to retain jitter information for rendered image pixels, thereby allowing subsequent upsampling methods using retained jitter information such as those described in FIGS. 3-5. The example shown here comprises a three-level downsampling pyramid, including a pixel grid 602 representing a ray-traced image frame provided from rendering block 206 of FIG. 2 from which other levels of the downsampling pyramid are derived. In this example, each successive level of the downsampling pyramid has half the resolution in each dimension as the preceding level, progressing from a 12×12 rendered image at 602 to a 6×6 image at 604 and a 3×3 image at 606. In practical applications, the number of pixels of the base image 602 may be much larger, such as to match or be a significant fraction of the display resolution of a computerized device. The downsampling pyramid of FIG. 6 is a simplified version of an image pyramid that may be constructed by denoise block 208 of FIG. 2 to perform denoising.

As shown here, the original image 602 may be progressively downsampled to produce images of lower resolution and lower noise that can be aliased to rendered image objects, such as using a GPU's tri-linear filtering hardware commonly used for trilinear interpolation. The downsampling is performed in some examples using a de-noising filter such as a filter generated by a neural network-based kernel prediction network, which in some examples comprises a convolutional neural network that generates a kernel of scalar weights or coefficients applied to neighboring pixels to calculate each de-noised pixel of an image. In a more detailed example, a kernel prediction network may predict a matrix of kernel coefficients for each pixel that comprises coefficients or weights for neighboring pixels that can be used to determine the de-noised pixel value by computing the de-noised pixel value from its original value and its neighboring pixels. Filter coefficients generated by a kernel prediction network may be used to build successive layers of the pyramid of FIG. 6 or comprise a part of a neural network such as the neural network 106 of FIG. 1.

In the example of FIG. 6, each higher level of the downsampling pyramid may be derived from a lowest level, such as by using filter coefficients generated by a kernel prediction network, other filtering, averaging, or another suitable method, and may result in an image that is lower in both resolution and noise than the preceding, lower pyramid level image from which it is derived. The progressive downsampling may be performed separately for different lighting components such as specular and diffuse lighting, which may be combined in a further example to generate a displayed image.

Although the number of pyramid levels in the example of FIG. 6 is three, this process may be performed repeatedly to produce a pyramid of any desired number N levels, where N may be a selectable or tunable parameter of the downsampling image pyramid. In further examples, the number of levels N may be determined by neural network prediction or estimation, by the desired output resolution of the rendered image, by the anticipated noise level of the rendered image, and/or by other such parameters.

The image pyramid of FIG. 6 may be employed by a GPU's tri-linear filter lighting hardware using predicted x, y, and z parameters from a neural network to select an image texture location within the pyramid to sample. In a more detailed example, to filter a pixel at given x and y locations on the rendered image being processed, the tri-linear filter block may receive an x offset and a y offset that shift the location of the sampling such as to make the sampling edge-aware, and a z parameter that indicates the level of the progressive downsampling pyramid from which to sample. The x, y, and z coordinates may be non-integers, such as where interpolation between pixel locations or downsampling pyramid levels is desired. The z coordinate in particular may correspond to a level of detail (lod), which may be an integer corresponding to a downsampling pyramid level or may be a non-integer corresponding to an interpolated location between downsampling pyramid levels to control the degree of blurring in sampled texture for each filtered pixel. Once desired x and y offsets and level of detail z have been specified for each pixel and appropriate texture filtering has been applied, the filtered images for lighting components such as specular and diffuse lighting may in some examples be combined and/or post-filtered.

The resulting tri-linear filtering process described in conjunction with FIG. 6 is one example of a denoising process that can be used to reduce pixel noise in a noisy rendered image, such as an image having relatively few rays traced per pixel during the rendering process. In the example provided here, jitter vectors are retained for the sampling points of the rendered image, such that subsequent upsampling using jitter vector information to reduce image artifacts such as checkerboarding and aliasing can be performed.

Figure 7:
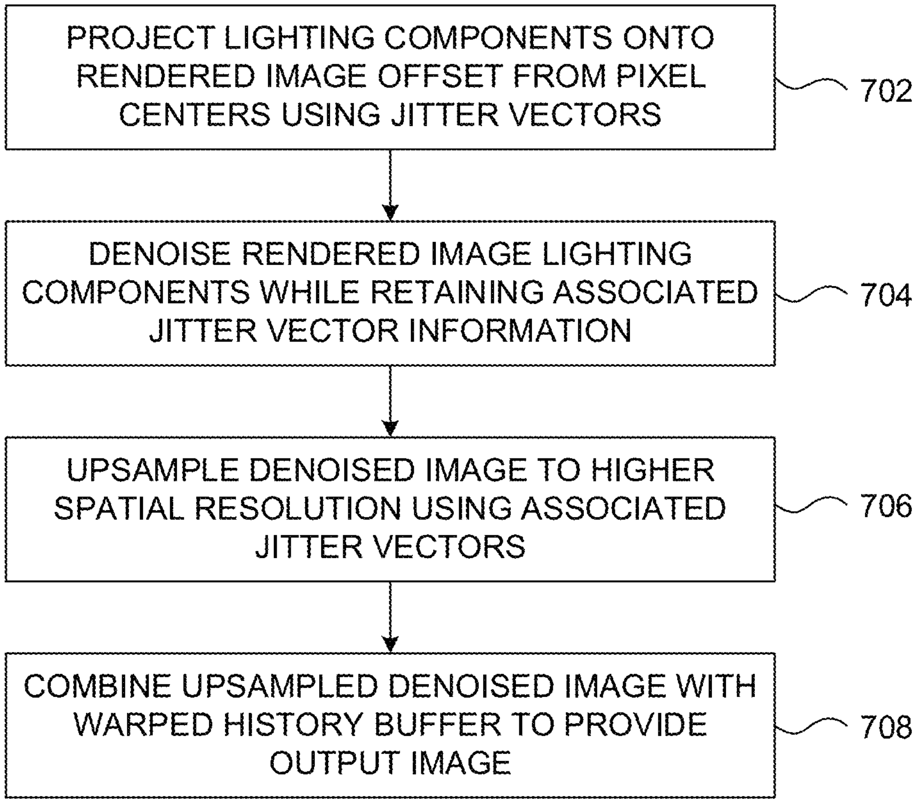
FIG. 7 is a flow diagram of a method of denoising and upsampling a rendered image, consistent with an example embodiment.

FIG. 7 is a flow diagram of a method of denoising and upsampling a rendered image, consistent with an example embodiment. At 702, one or more lighting components are projected onto a rendered image. In a further example, the lighting components are projected onto sampling points of pixel locations in the rendered image at a first resolution, and the sampling points are offset from pixel centers using a jitter vector that places the sampling point for each pixel at an offset location within the pixel. Because the number of rays traced per pixel location may be limited by the computational resources available and by the desired frame rate for rendering an image stream in real time, the sampled lighting components for each pixel may be somewhat noisy and may vary from what would be sampled if a much greater number of lighting component rays could be traced for each pixel.

The rendered image is therefore denoised at 704, such as by using a filtering or denoising process that preserves the jitter vector offset information associated with each sampled pixel. In one example, this comprises avoiding using a history buffer that might serve to average out the jitter offsets of sampling points over time and thereby effectively average out the influence of the jitter vectors on the denoised output. The denoising filter in a more detailed example comprises a trilinear filter, which may use sequentially downsampled versions of the rendered image and a desired level of detail for each pixel location to select which original or sequentially downsampled version of the rendered image from which to draw color information. In a further example, the trilinear filter may interpolate between downsampled versions or between the original and a downsampled version of the original image. In another example, the trilinear filter may perform filtering separately for at least two of two or more lighting components of the rendered image.

The denoised image is upsampled at 706 to a higher spatial resolution than the rendered image, such as to transform an image rendered at a lower resolution due to computational constraints to a higher resolution for display on an electronic device. The upsampling in a more detailed example uses the jitter vector information for the pixels of the denoised image to perform the upsampling, such as by using jitter offsets to weight the pixel contribution to an output image and/or using averaging to fill sparse or empty upsampled pixel locations. The upsampling in a further example may be performed separately for two or more lighting components, such as specular, diffuse, and albedo.

The upsampled image is combined with a warped history buffer image at 708 to provide an output image, which in some further examples is at an upsampled resolution that matches a display resolution of an electronic device. The upsampled image is both denoised to reduce the pixel noise inherent in rendered images having limited rays cast per pixel in the rendering and sampling process, and is subsequently upscaled using a method that takes advantage of jitter vectors employed in choosing sampling points in sampling the rendered image pixels using jitter information retained through the denoising process. The upsampling process therefore has the benefit of upsampling a less noisy image due to the prior denoising step, but retains the ability to use jitter information such as jitter vector weighting pixel samples and/or averaging sparse or empty pixels in generating an upsampled image to produce an upsampled image having reduced upsampling artifacts such as checkerboarding and aliasing.

Various parameters in the examples presented herein, such as blending coefficients, denoising or trilinear filter parameters, and other such parameters, may be determined using machine learning techniques such as a trained neural network. In some examples, a neural network may comprise a graph comprising nodes to model neurons in a brain. In this context, a "neural network" means an architecture of a processing device defined and/or represented by a graph including nodes to represent neurons that process input signals to generate output signals, and edges connecting the nodes to represent input and/or output signal paths between and/or among neurons represented by the graph. In particular implementations, a neural network may comprise a biological neural network, made up of real biological neurons, or an artificial neural network, made up of artificial neurons, for solving artificial intelligence (AI) problems, for example. In an implementation, such an artificial neural network may be implemented by one or more computing devices such as computing devices including a central processing unit (CPU), graphics processing unit (GPU), digital signal processing (DSP) unit and/or neural processing unit (NPU), just to provide a few examples. In a particular implementation, neural network weights associated with edges to represent input and/or output paths may reflect gains to be applied and/or whether an associated connection between connected nodes is to be excitatory (e.g., weight with a positive value) or inhibitory connections (e.g., weight with negative value). In an example implementation, a neuron may apply a neural network weight to input signals, and sum weighted input signals to generate a linear combination.

In one example embodiment, edges in a neural network connecting nodes may model synapses capable of transmitting signals (e.g., represented by real number values) between neurons. Responsive to receipt of such a signal, a node/neural may perform some computation to generate an output signal (e.g., to be provided to another node in the neural network connected by an edge). Such an output signal may be based, at least in part, on one or more weights and/or numerical coefficients associated with the node and/or edges providing the output signal. For example, such a weight may increase or decrease a strength of an output signal. In a particular implementation, such weights and/or numerical coefficients may be adjusted and/or updated as a machine learning process progresses. In an implementation, transmission of an output signal from a node in a neural network may be inhibited if a strength of the output signal does not exceed a threshold value.

Figure 8:
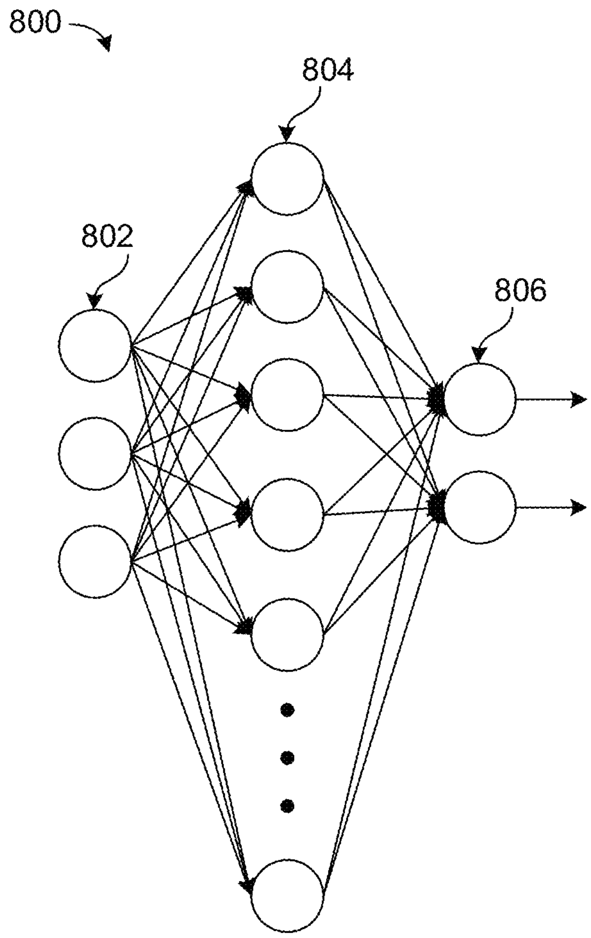
FIG. 8 is a schematic diagram of a neural network, consistent with an example embodiment.

FIG. 8 is a schematic diagram of a neural network 800 formed in "layers" in which an initial layer is formed by nodes 802 and a final layer is formed by nodes 806. All or a portion of features of neural network 800 may be implemented various embodiments of systems described herein. Neural network 800 may include one or more intermediate layers, shown here by intermediate layer of nodes 804. Edges shown between nodes 802 and 804 illustrate signal flow from an initial layer to an intermediate layer. Likewise, edges shown between nodes 804 and 806 illustrate signal flow from an intermediate layer to a final layer. Although FIG. 8 shows each node in a layer connected with each node in a prior or subsequent layer to which the layer is connected, i.e., the nodes are fully connected, other neural networks will not be fully connected but will employ different node connection structures. While neural network 800 shows a single intermediate layer formed by nodes 804, it should be understood that other implementations of a neural network may include multiple intermediate layers formed between an initial layer and a final layer.

According to an embodiment, a node 802, 804 and/or 806 may process input signals (e.g., received on one or more incoming edges) to provide output signals (e.g., on one or more outgoing edges) according to an activation function. An "activation function" as referred to herein means a set of one or more operations associated with a node of a neural network to map one or more input signals to one or more output signals. In a particular implementation, such an activation function may be defined based, at least in part, on a weight associated with a node of a neural network. Operations of an activation function to map one or more input signals to one or more output signals may comprise, for example, identity, binary step, logistic (e.g., sigmoid and/or soft step), hyperbolic tangent, rectified linear unit, Gaussian error linear unit, Softplus, exponential linear unit, scaled exponential linear unit, leaky rectified linear unit, parametric rectified linear unit, sigmoid linear unit, Swish, Mish, Gaussian and/or growing cosine unit operations. It should be understood, however, that these are merely examples of operations that may be applied to map input signals of a node to output signals in an activation function, and claimed subject matter is not limited in this respect.

Additionally, an "activation input value" as referred to herein means a value provided as an input parameter and/or signal to an activation function defined and/or represented by a node in a neural network. Likewise, an "activation output value" as referred to herein means an output value provided by an activation function defined and/or represented by a node of a neural network. In a particular implementation, an activation output value may be computed and/or generated according to an activation function based on and/or responsive to one or more activation input values received at a node. In a particular implementation, an activation input value and/or activation output value may be structured, dimensioned and/or formatted as "tensors". Thus, in this context, an "activation input tensor" as referred to herein means an expression of one or more activation input values according to a particular structure, dimension and/or format. Likewise in this context, an "activation output tensor" as referred to herein means an expression of one or more activation output values according to a particular structure, dimension and/or format.

In particular implementations, neural networks may enable improved results in a wide range of tasks, including image recognition, speech recognition, just to provide a couple of example applications. To enable performing such tasks, features of a neural network (e.g., nodes, edges, weights, layers of nodes and edges) may be structured and/or configured to form "filters" that may have a measurable/numerical state such as a value of an output signal. Such a filter may comprise nodes and/or edges arranged in "paths" and are to be responsive to sensor observations provided as input signals. In an implementation, a state and/or output signal of such a filter may indicate and/or infer detection of a presence or absence of a feature in an input signal.

In particular implementations, intelligent computing devices to perform functions supported by neural networks may comprise a wide variety of stationary and/or mobile devices, such as, for example, automobile sensors, biochip transponders, heart monitoring implants, Internet of things (IoT) devices, kitchen appliances, locks or like fastening devices, solar panel arrays, home gateways, smart gauges, robots, financial trading platforms, smart telephones, cellular telephones, security cameras, wearable devices, thermostats, Global Positioning System (GPS) transceivers, personal digital assistants (PDAs), virtual assistants, laptop computers, personal entertainment systems, tablet personal computers (PCs), PCs, personal audio or video devices, personal navigation devices, just to provide a few examples.

According to an embodiment, a neural network may be structured in layers such that a node in a particular neural network layer may receive output signals from one or more nodes in an upstream layer in the neural network, and provide an output signal to one or more nodes in a downstream layer in the neural network. One specific class of layered neural networks may comprise a convolutional neural network (CNN) or space invariant artificial neural networks (SIANN) that enable deep learning. Such CNNs and/or SIANNs may be based, at least in part, on a shared-weight architecture of a convolution kernels that shift over input features and provide translation equivariant responses. Such CNNs and/or SIANNs may be applied to image and/or video recognition, recommender systems, image classification, image segmentation, medical image analysis, natural language processing, brain-computer interfaces, financial time series, just to provide a few examples.

Another class of layered neural network may comprise a recursive neural network (RNN) that is a class of neural networks in which connections between nodes form a directed cyclic graph along a temporal sequence. Such a temporal sequence may enable modeling of temporal dynamic behavior. In an implementation, an RNN may employ an internal state (e.g., memory) to process variable length sequences of inputs. This may be applied, for example, to tasks such as unsegmented, connected handwriting recognition or speech recognition, just to provide a few examples. In particular implementations, an RNN may emulate temporal behavior using finite impulse response (FIR) or infinite impulse response (IIR) structures. An RNN may include additional structures to control stored states of such FIR and IIR structures to be aged. Structures to control such stored states may include a network or graph that incorporates time delays and/or has feedback loops, such as in long short-term memory networks (LSTMs) and gated recurrent units.

According to an embodiment, output signals of one or more neural networks (e.g., taken individually or in combination) may at least in part, define a "predictor" to generate prediction values associated with some observable and/or measurable phenomenon and/or state. In an implementation, a neural network may be "trained" to provide a predictor that is capable of generating such prediction values based on input values (e.g., measurements and/or observations) optimized according to a loss function. For example, a training process may employ backpropagation techniques to iteratively update neural network weights to be associated with nodes and/or edges of a neural network based, at least in part on "training sets." Such training sets may include training measurements and/or observations to be supplied as input values that are paired with "ground truth" observations or expected outputs. Based on a comparison of such ground truth observations and associated prediction values generated based on such input values in a training process, weights may be updated according to a loss function using backpropagation. The neural networks employed in various examples can be any known or future neural network architecture, including traditional feed-forward neural networks, convolutional neural networks, or other such networks.

Figure 9:
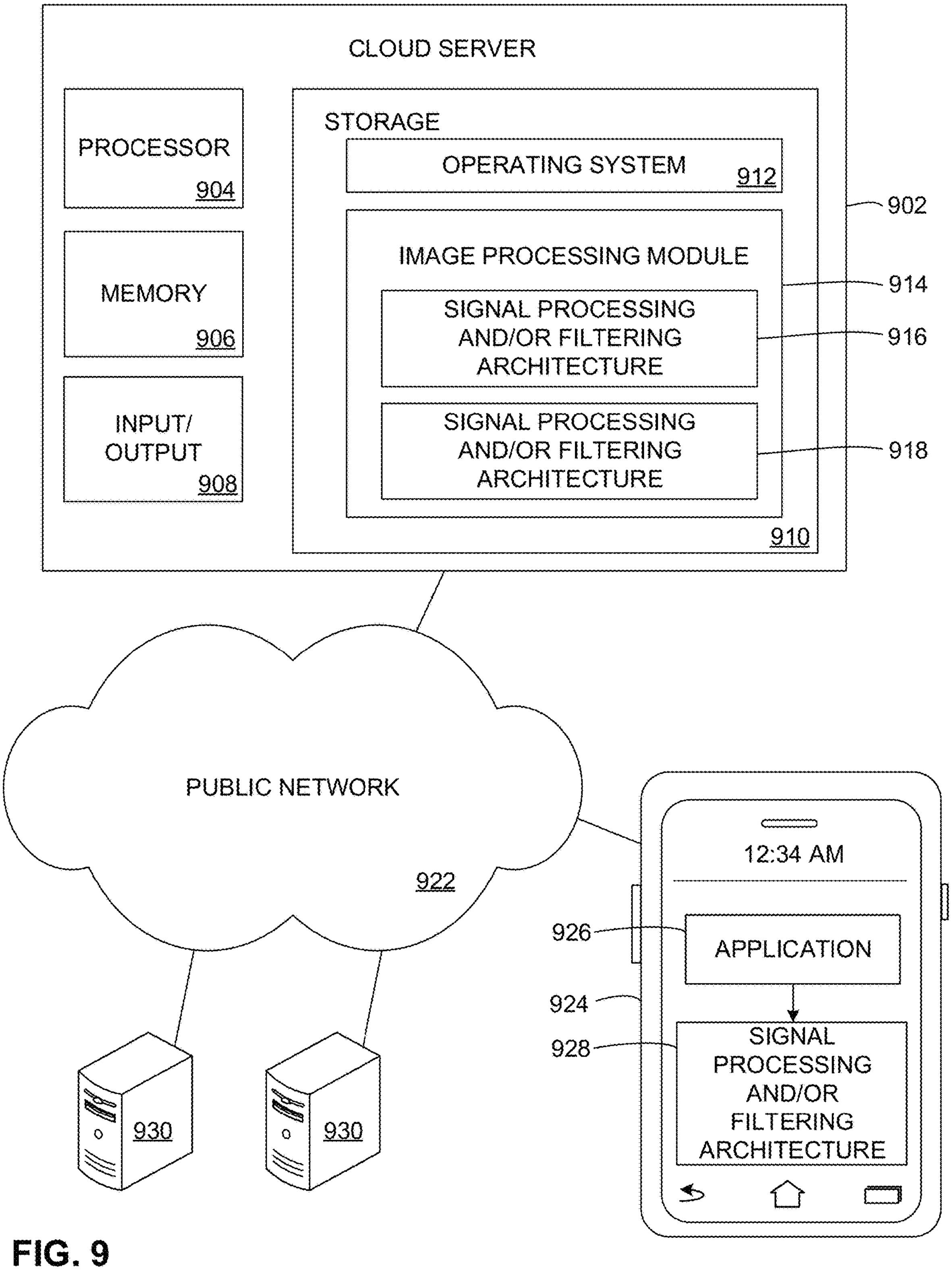
FIG. 9 shows a computing environment in which one or more image processing and/or filtering architectures (e.g., image processing stages, FIG. 1) may be employed, consistent with an example embodiment.

FIG. 9 shows a computing environment in which one or more image processing and/or filtering architectures (e.g., image processing stages, FIG. 1) may be employed, consistent with an example embodiment. Here, a cloud server 902 includes a processor 904 operable to process stored computer instructions, a memory 906 operable to store computer instructions, values, symbols, parameters, etc., for processing on the cloud server, and input/output 908 such as network connections, wireless connections, and connections to accessories such as keyboards and the like. Storage 910 may be nonvolatile, and may store values, parameters, symbols, content, code, etc., such as code for an operating system 912 and code for software such as image processing module 914. Image processing module 914 may comprise multiple signal processing and/or filtering architectures 916 and 918, which may be operable to render and/or process images. Signal processing and/or filtering architectures may be available for processing images or other content stored on a server, or for providing remote service or "cloud" service to remote computers such as computers 930 connected via a public network 922 such as the Internet.

Smartphone 924 may also be coupled to a public network in the example of FIG. 9, and may include an application 926 that utilizes image processing and/or filtering architecture 928 for processing rendered images such as a video game, virtual reality application, or other application 926. Image processing and/or filtering architectures 916, 918, and 928 may provide faster and more efficient computation of effects such as de-noising a ray-traced rendered image in an environment such as a smartphone, and can provide for longer battery life due to reduction in power needed to impart a desired effect and/or compute a result. In some examples, a device such as smartphone 924 may use a dedicated signal processing and/or filtering architecture 928 for some tasks, such as relatively simple image rendering that does not require substantial computational resources or electrical power, and offloads other processing tasks to a signal processing and/or filtering architecture 916 or 918 of cloud server 902 for more complex tasks.

Signal processing and/or filtering architectures 916, 918, and 928 of FIG. 9 may, in some examples, be implemented in software, where various nodes, tensors, and other elements of processing stages (e.g., processing blocks in FIG. 1) may be stored in data structures in a memory such as 906 or storage 910. In other examples, signal processing and/or filtering architectures 916, 918, and 928 may be implemented in hardware, such as a convolutional neural network structure that is embodied within the transistors, resistors, and other elements of an integrated circuit. In an alternate example, signal processing and/or filtering architectures 916, 918 and 928 may be implemented in a combination of hardware and software, such as a neural processing unit (NPU) having software-configurable weights, network size and/or structure, and other such configuration parameters.

Trained neural network 106 (FIG. 1) and other neural networks as described herein in particular examples, may be formed in whole or in part by and/or expressed in transistors and/or lower metal interconnects (not shown) in processes (e.g., front end-of-line and/or back-end-of-line processes) such as processes to form complementary metal oxide semiconductor (CMOS) circuitry. The various blocks, neural networks, and other elements disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Computing devices such as cloud server 902, smartphone 924, and other such devices that may employ signal processing and/or filtering architectures can take many forms and can include many features or functions including those already described and those not described herein.

Figure 10:
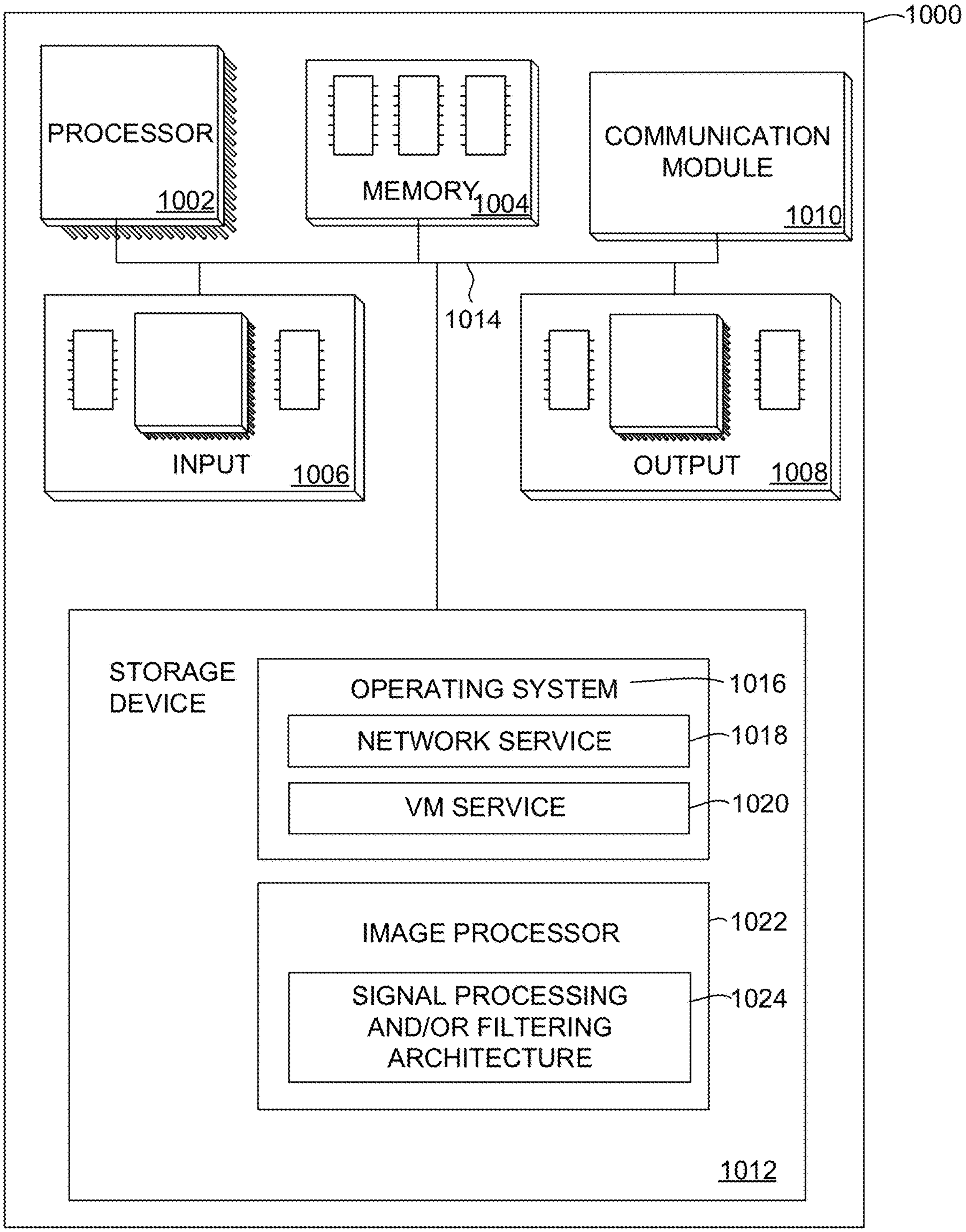
FIG. 10 shows a block diagram of a general-purpose computerized system, consistent with an example embodiment.

FIG. 10 shows a block diagram of a general-purpose computerized system, consistent with an example embodiment. FIG. 10 illustrates only one particular example of computing device 1000, and other computing devices 1000 may be used in other embodiments. Although computing device 1000 is shown as a standalone computing device, computing device 1000 may be any component or system that includes one or more processors or another suitable computing environment for executing software instructions in other examples, and need not include all of the elements shown here.

As shown in the specific example of FIG. 10, computing device 1000 includes one or more processors 1002, memory 1004, one or more input devices 1006, one or more output devices 1008, one or more communication modules 1010, and one or more storage devices 1012. Computing device 1000, in one example, further includes an operating system 1016 executable by computing device 1000. The operating system includes in various examples services such as a network service 1018 and a virtual machine service 1020 such as a virtual server. One or more applications, such as image processor 1022 are also stored on storage device 1012, and are executable by computing device 1000.

Each of components 1002, 1004, 1006, 1008, 1010, and 1012 may be interconnected (physically, communicatively, and/or operatively) for inter-component communications, such as via one or more communications channels 1014. In some examples, communication channels 1014 include a system bus, network connection, inter-processor communication network, or any other channel for communicating data. Applications such as image processor 1022 and operating system 1016 may also communicate information with one another as well as with other components in computing device 1000.

Processors 1002, in one example, are configured to implement functionality and/or process instructions for execution within computing device 1000. For example, processors 1002 may be capable of processing instructions stored in storage device 1012 or memory 1004. Examples of processors 1002 include any one or more of a microprocessor, a controller, a central processing unit (CPU), a graphics processing unit (GPU), a neural processing unit (NPU), an image signal processor (ISP), a digital signal processor (DSP), an application specific integrated circuit (ASIC), a field-programmable gate array (FPGA), or similar discrete or integrated logic circuitry.

One or more storage devices 1012 may be configured to store information within computing device 1000 during operation. Storage device 1012, in some examples, is known as a computer-readable storage medium. In some examples, storage device 1012 comprises temporary memory, meaning that a primary purpose of storage device 1012 is not long-term storage. Storage device 1012 in some examples is a volatile memory, meaning that storage device 1012 does not maintain stored contents when computing device 1000 is turned off. In other examples, data is loaded from storage device 1012 into memory 1004 during operation. Examples of volatile memories include random access memories (RAM), dynamic random access memories (DRAM), static random access memories (SRAM), and other forms of volatile memories known in the art. In some examples, storage device 1012 is used to store program instructions for execution by processors 1002. Storage device 1012 and memory 1004, in various examples, are used by software or applications running on computing device 1000 such as image processor 1022 to temporarily store information during program execution.

Storage device 1012, in some examples, includes one or more computer-readable storage media that may be configured to store larger amounts of information than volatile memory. Storage device 1012 may further be configured for long-term storage of information. In some examples, storage devices 1012 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1000, in some examples, also includes one or more communication modules 1010. Computing device 1000 in one example uses communication module 1010 to communicate with external devices via one or more networks, such as one or more wireless networks. Communication module 1010 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 1000 uses communication module 1010 to wirelessly communicate with an external device such as via public network 922 of FIG. 9.

Computing device 1000 also includes in one example one or more input devices 1006. Input device 1006, in some examples, is configured to receive input from a user through tactile, audio, or video input. Examples of input device 1006 include a touchscreen display, a mouse, a keyboard, a voice responsive system, video camera, microphone or any other type of device for detecting input from a user.

One or more output devices 1008 may also be included in computing device 1000. Output device 1008, in some examples, is configured to provide output to a user using tactile, audio, or video stimuli. Output device 1008, in one example, includes a display, a sound card, a video graphics adapter card, or any other type of device for converting a signal into an appropriate form understandable to humans or machines. Additional examples of output device 1008 include a speaker, a light-emitting diode (LED) display, a liquid crystal display (LCD or OLED), or any other type of device that can generate output to a user.

Computing device 1000 may include operating system 1016. Operating system 816, in some examples, controls the operation of components of computing device 1000, and provides an interface from various applications such as image processor 1022 to components of computing device 1000. For example, operating system 1016, in one example, facilitates the communication of various applications such as image processor 1022 with processors 1002, communication unit 1010, storage device 1012, input device 1006, and output device 1008. Applications such as image processor 1022 may include program instructions and/or data that are executable by computing device 1000. As one example, image processor 1022 may implement a signal processing and/or filtering architecture 1024 to perform image processing tasks or rendered image processing tasks such as those described above, which in a further example comprises using signal processing and/or filtering hardware elements such as those described in the above examples. These and other program instructions or modules may include instructions that cause computing device 1000 to perform one or more of the other operations and actions described in the examples presented herein.

Features of example computing devices in FIGS. 9 and 10 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU), image signal processor (ISP) and/or neural processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that 35 USC § 112 (f) not be implicated by use of the term "computing device," "processor," "processing unit," "processing circuit" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIG. 1 and in the text associated with the foregoing figure(s) of the present patent application.

The term electronic file and/or the term electronic document, as applied herein, refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format).

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or subobjects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

What is claimed is:

1. A method comprising:

projecting one or more lighting components onto pixel locations of a rendered image in a first image format, the projected one or more lighting components being set off from pixel location centers in the first image format according to associated jitter vectors;

for at least one of the one or more lighting components, denoising projected lighting components in the rendered image to provide a denoised image in the first image format, wherein the denoising projected lighting components preserves the associated jitter vectors; and transforming the denoised image to a processed image in a second image format, the processed image to be transformed by application of upsampling or temporal anti-aliasing, or a combination thereof, using the associated jitter vectors, the second image format having a spatial resolution at least as high as the first image format.

2. The method of claim 1, further comprising combining the processed image with a warped history image in the second image format to provide an output image.

3. The method of claim 2, wherein combining the processed image with the warped history image comprises combining the processed image with the warped history image based on neural network blending coefficient prediction.

4. The method of claim 1, wherein denoising the projected lighting components in the rendered image further comprises using trilinear filtering to perform denoising on at least one of the projected one or more lighting components.

5. The method of claim 4, wherein trilinear filtering comprises:

generating multiple successively spatially downsampled versions of the rendered image for the at least one of the projected one or more lighting components; and determining one or more versions of the rendered image from among the rendered image and the multiple successively spatially downsampled versions of the rendered image for sampling a texture feature based, at least in part, on a prediction computed by a neural network.

6. The method of claim 5, wherein sampling the texture feature comprises combining portions of the one or more versions of the rendered image based, at least in part, on an interpolation between and/or among the one or more versions.

7. The method of claim 4, wherein using trilinear filtering to perform denoising is performed separately for the one or more lighting components of the rendered image.

8. The method of claim 1, further comprising executing a neural network to provide parameters to affect denoising of the projected lighting components and to affect the transforming of the of the denoised image.

9. The method of claim 1, wherein the one or more lighting components comprise one or more of specular lighting, diffuse lighting, and albedo.

10. The method of claim 1, wherein transforming the denoised image to a processed image in a second image format using the associated jitter vectors comprises transforming the one or more lighting components of the denoised image separately.

11. A computing device, comprising:

a memory comprising one more storage devices; and one or more processors coupled the memory, the one or more processors operable to, for at least one image:

project one or more lighting components onto pixel locations of a rendered image in a first image format, the projected one or more lighting components being set off from pixel location centers in the first image format according to associated jitter vectors;

for at least one of the one or more lighting components, denoise projected lighting components in the rendered image to provide a denoised image in the first image format, wherein the denoising projected lighting components preserves the associated jitter vectors; and transform the denoised image to a processed image in a second image format, the processed image transformed by application of upsampling or temporal antialiasing, or a combination thereof, using the associated jitter vectors, the second image format having a spatial resolution at least as high as the first image format.

12. The computing device of claim 11, wherein the one or more processors are further operable to combine the processed image with a warped history image in the second image format to provide an output image.

13. The computing device of claim 12, wherein the one or more processors are further operable to combine the processed image with the warped history image based, at least in part, on neural network blending coefficient prediction.

14. The computing device of claim 11, wherein the one or more processors are further operable to denoise the projected one or more lighting components in the rendered image based, at least in part, on application of trilinear filtering to denoise at least one of the projected one or more lighting components.

15. The computing device of claim 14, wherein the one or more processors are further operable to:

generate multiple successively spatially downsampled versions of the rendered image for the at least one of the projected one or more lighting components; and determine one or more versions of the rendered image from among the rendered image and the multiple successively spatially downsampled versions of the rendered image for sampling a texture feature based, at least in part, on a prediction computed by a neural network.

16. The computing device of claim 15, wherein the one or more processors are further operable to:

combine portions of the one or more versions of the rendered image based, at least in part, on an interpolation between and/or among the one or more versions.

17. The computing device of claim 14, wherein the one or more processors are further operable to apply trilinear filtering to perform denoising separately for individual ones of the one or more lighting components of the rendered image.

18. The computing device of claim 11, wherein the one or more processors are further operable to execute a neural network to provide parameters to affect denoising of the projected one or more lighting components and to affect transformation of the denoised image.

19. The computing device of claim 11, wherein the one or more lighting components comprise one or more of specular lighting, diffuse lighting, and albedo.

* * * * *